United States Patent Office 2,805,788
Patented Sept. 10, 1957

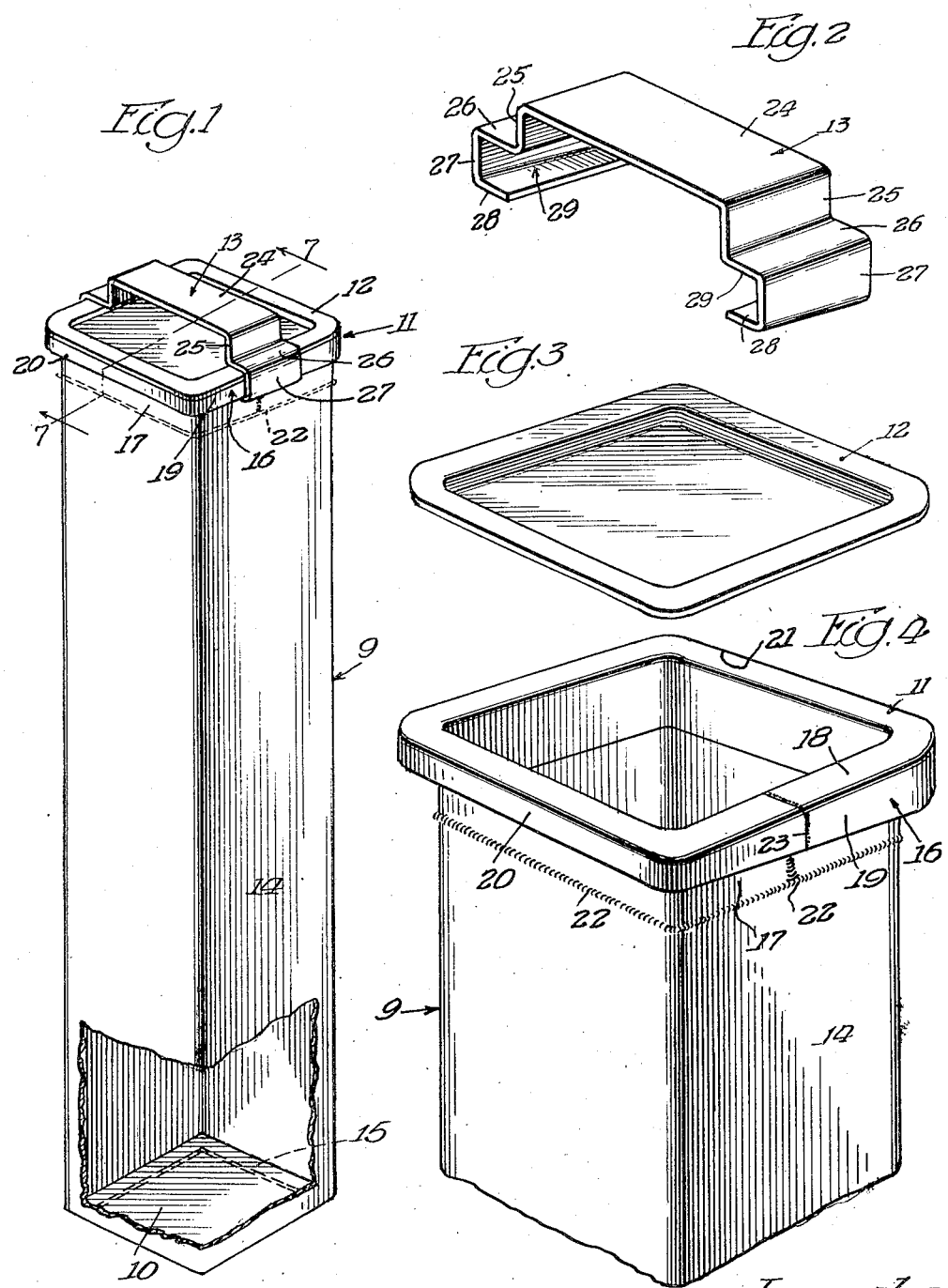

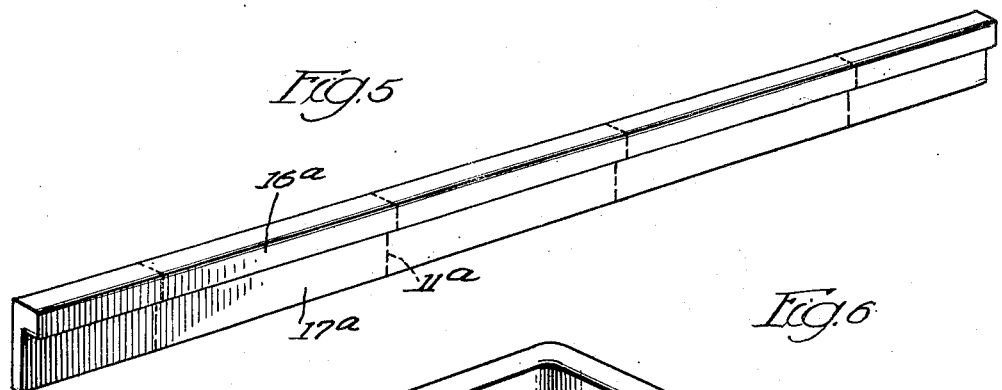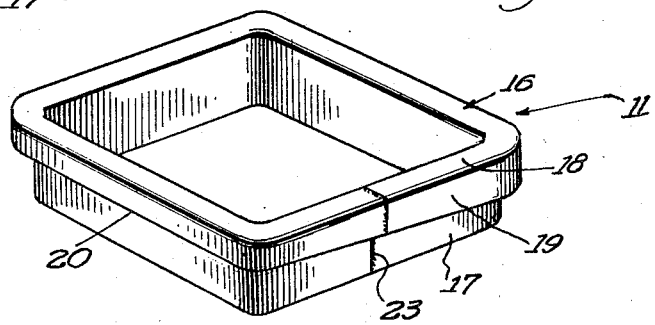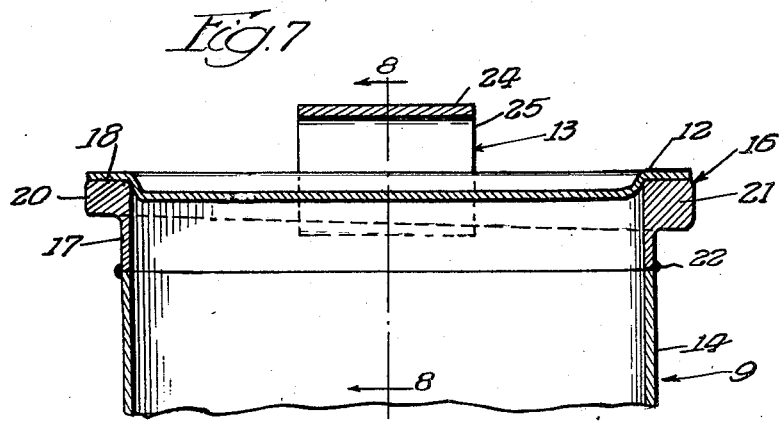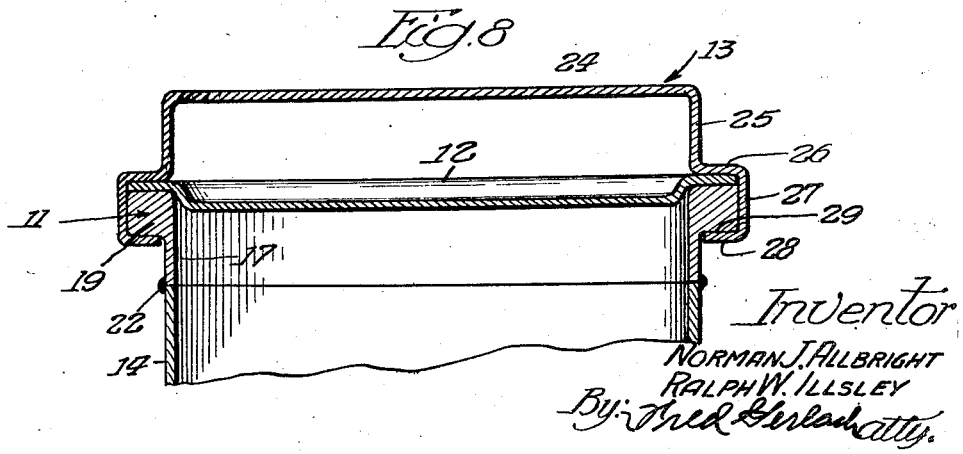

2,805,788

COVER-EQUIPPED CONTAINER FOR RETAINING AND MOLDING A FOOD PRODUCT IN CONNECTION WITH PROCESSING THEREOF

Norman J. Allbright and Ralph W. Illsley, Chicago, Ill., assignors to The Allbright-Nell Company, Chicago, Ill., a corporation of Illinois Application September 30, 1953, Serial No. 383,296

1 Claim. (Cl. 220—55)

The present invention relates generally to containers. More particularly the invention relates to that type of container which is adapted to retain and mold or shape a food product, such as ground and mixed sandwich meat, while it is being cooked or otherwise processed and as its parts comprises: (1) an elongated tubular sheet metal body which is adapted to extend vertically, is substantially square in cross section and has the upper end thereof normally open in order to provide for insertion and removal of the food product; (2) a removable, substantially square cover for closing the open upper end of the body during a cooking operation; and (3) means for releasably clamping the cover in its operative position.

One object of the invention is to provide a container of this type which is an improvement upon, and has certain advantages over, previously designed containers and is characterized by high efficiency, simplicity of design and low cost of manufacture.

Another object of the invention is to provide a container of the type under consideration in which the open upper end of the elongated tubular body is provided with a continuous substantially square one-piece frame which is formed of extruded metal and consists of a solid comparatively thick outwardly extending flange-part and a comparatively thin skirt-part which is connected to, and depends from, the lower inner corner of the flange-part.

Another object of the invention is to provide a container of the character last mentioned in which the flange-part of the frame serves as a reenforcing medium for the upper end of the container body and forms a seat for the marginal portion of the cover when the cover is in its closed or operative position, and the skirt-part of the frame is shaped conformably to, and is the same in thickness as, the four sides of the elongated tubular body of the container and has the lower edge thereof in abutting relation with, and welded directly to, the upper edges of the body sides.

Another object of the invention is to provide a container of the type and character under consideration in which the means for releasably clamping the cover in place is in the form of an inverted U-shaped member which is formed of a one-piece sheet metal stamping and consists of a crosspiece and a pair of depending side pieces, the lower ends of which are shaped to form a pair of opposed inwardly facing open ended channels for slidably receiving oppositely disposed side portions of the cover and the subjacent oppositely disposed side portions of the flange-part of the frame.

A further object of the invention is to provide a container of the type and character under consideration in which the crosspiece of the inverted U-shaped member serves as a handle whereby the container as a whole may be readily transported, and the inwardly facing channels in the lower ends of the side pieces of the member and the oppositely disposed channel receiving side portions of the flange-part of the frame are wedge-shaped in order that when the inverted U-shaped member is slid laterally into place it is frictionally retained in its operative position and serves releasably but firmly to clamp the marginal portion of the cover against the upper surface of the flange-part of the frame.

A still further object of the invention is to provide a container which is generally of new and improved construction and effectively and efficiently fulfills its intended purpose.

Other objects of the invention and the various advantages and characteristics of the present container will be apparent from a consideration of the following detailed description.

The invention consists in the several novel features which are hereinafter set forth and are more particularly defined by the claim at the conclusion hereof.

In the drawings which accompany and form a part of this specification or disclosure and in which like numerals of reference denote corresponding parts throughout the several views:

Figure 1 is a top perspective view showing a container embodying the invention with the cover and inverted U-shaped clamping member in place, parts of the lower end of the container being broken away in order to illustrate the bottom construction of the container;

Figure 2 is a top perspective of the inverted U-shaped member which constitutes the releasable clamping means for the cover;

Figure 3 is a top perspective of the cover of the container;

Figure 4 is a fragmentary top perspective of the container body illustrating in detail the construction, design and arrangement of the substantially square outwardly extending solid frame at the open upper end of the container body;

Figure 5 is a perspective showing a length of extruded metal before it is bent at right angles at different portions thereof to form the substantially square outwardly extending solid frame for the open upper end of the container body;

Figure 6 is a perspective showing the length of extruded metal after it has been bent and welded together at the ends thereof in order to form the skirt-equipped frame;

Figure 7 is an enlarged vertical section taken on the line 7—7 of Figure 1 and illustrating in detail the manner in which the inverted U-shaped member serves releasably to clamp the cover in its operative position; and Figure 8 is a vertical transverse section on the line 8—8 of Figure 7.

The container which is shown in the drawings constitutes the preferred form or embodiment of the invention. It is essentially designed for use in the meat packing industry and serves as a medium or instrumentality for retaining and molding or shaping a food product while the latter is being cooked or otherwise processed. Primarily the container is designed for use in connection with processing ground and mixed sandwich meat. As its components or parts the container comprises an elongated tubular body 9, a bottom 10, a frame 11, a removable cover 12 and an inverted U-shaped member 13 for releasably clamping the cover in place.

The body 9 of the container is substantially square in cross section and comprises four rectangular sides 14, the side margins of which are formed integrally with one another. As shown in the drawings the container body is of uniform cross section from end to end. The sides 14 are formed of sheet metal of such gauge that the body as a whole is rigid while at the same time it is sufficiently light in weight to permit it to be handled with ease and facility. The body 9 is shown in Figure 1 of the drawings as being vertically positioned. It is to be understood, however, that the body may be placed in any desired position, such, for example, as a horizontal position. The lower end of the body is provided with a continuous inwardly extending square flange 15 and the upper end of the body is normally open. The flange 15 is formed integrally with, and extends inwards at right angles to, the lower margins of the body sides 14 and serves to reenforce or strengthen the lower end of the body against collapse or lateral distortion.

The bottom 10 is in the form of a square sheet metal plate and serves as a closure for the bottom of the tubular body 9. It is shaped conformably to the interior of the body and normally rests on, and is supported by, the continuous inwardly extending flange 15 on the lower margins of the body sides 14. It is contemplated that the body will be filled with the food product to be processed by introducing the product while in plastic form through the open upper end of the body. It is also contemplated that after the food product has been cooked or otherwise processed so that it is in hardened or semi-hardened form it will be removed from the body by applying upward pressure to the bottom 7 so as to cause the latter together with the processed food product to slide upwards in the direction of the open upper end of the body. The inwardly extending flange 15 prevents the bottom 10 from moving downwards through the bottom of the tubular body 9.

The frame 11 constitutes, in effect, the open upper end of the container body and serves to reenforce such end of the body. It is substantially square so far as configuration is concerned and is formed of extruded metal. As best shown in Figures 4 and 6, the frame 11 comprises a continuous outwardly extending solid flange-part 16 and a continuous depending skirt-part 17. The flange-part 16 of the frame 11 is comparatively thick both as to height and width and has a flat top surface 18 which extends at true right angles to the longitudinal center line of the elongated tubular body 9 and forms a seat for the marginal portion of the cover 12 as hereinafter described. The side portions of the flange-part 16 are designated by the reference numeral 19, the front portion is designated by the reference numeral 20 and the back portion is designated by the reference numeral 21. The skirt-part 17 of the frame 11 is connected to, and projects downwards from, the lower inner corner of the flange part 16. It is shaped correspondingly to the body 9 and is the same in thickness as the body sides 14. The lower edge of the skirt-part is in abutting relation with the upper edges of the body sides and is fixedly connected thereto by a continuous weld 22. The inner surfaces of the depending skirt-part 17 and the inner surfaces of the flange-part 16 are flush or coplanar. As best shown in full lines in Figures 1, 4 and 6 and by a dotted line in Figure 7, the bottom surfaces of the side portions 19 of the flange-part 16 are upwardly and forwardly inclined in order that the side portions are wedge shaped. In view of the fact that the bottom surfaces of the side portions 19 are upwardly and forwardly inclined the small ends of the side portions face in the direction of the front portion 20. The height of the front portion 20 corresponds to the height of the front small ends of the side portions 19 and as a result the ends of the bottom surface of the front portion adjoin and are flush with the front ends of the bottom surfaces of the side portions 19. The back portion 21 of the flange-part 16 is the same in height as the rear ends of the side portions 19 and as a result the ends of the bottom surface of the back portion adjoin and are flush with the rear ends of the bottom surfaces of the side portions 19. The frame 11 is formed of extruded metal as heretofore pointed out. Preferably the frame is formed by utilizing a length of extruded metal stock like that shown in Figure 5. Such length comprises a flange-part 16a and a depending skirt-part 17a. The flange-part 16a is of uniform height throughout its length and corresponds in height to the height of the back portion 21 of the complete or formed frame 11. In connection with formation of the frame the length of extruded metal that is shown in Figure 5 is bent at right angles on the four vertically extending dotted lines 11a in order to make it in the form of a continuous skirt for frame forming purposes. After the bending operation the ends of the length of extruded metal are connected together by a weld 23. At the conclusion of the welding operation the bottom surfaces of the side portions and the bottom surfaces of the front portion of the flange-part are machined so that said side portions are wedge-shaped and the front portion is of the proper height. After the machine operation the frame is mounted on the upper end of the elongated tubular body 9 and manipulated so that the skirt-part 17 is in registry with the body sides 14. Thereafter the continuous weld 22 is formed so as fixedly to connect the bottom or lower edge of the skirt-part 17 to the upper edges of the sides 14 of the body.

The cover 12 of the container serves as a removable closure for the open upper end of the body 9 and is adapted to be utilized after the body has been charged with the desired amount of the food product and while the food product is being processed in the body. It is in the form of a one-piece sheet metal stamping and is shaped conformably to the continuous substantially square flange-part 16 of the frame 11. When the cover is in its closed or operative position the marginal portion of the cover registers with and rests directly on the flat top surface of the flange-part 16 as shown in Figures 1, 7 and 8. The remaining portion of the cover, i. e., the portion that is inwards of the marginal portion, is struck downwards with respect to the marginal portion and is adapted snugly to fit within the flange-part 16. By reason of the fact that the cover is square and shaped conformably or correspondingly to the flange-part 16 of the frame 11 it may be satisfactorily placed in any one of four different positions on the flange-part while at the same time it serves as an effective seal or closure for the open end of the container body 9.

The inverted U-shaped member 13 of the container is in the form of a one-piece sheet metal stamping and consists of a flat horizontally extending crosspiece 24 and a pair of depending side pieces 25. The side pieces 25 are connected to the ends of, and are the same in width as, the crosspiece 24. Preferably the width of the inverted U-shaped member 13 is approximately one-third of the distance between the front and back portions 20 and 21 of the outwardly extending solid flange-part 16 of the frame 11. The lower ends of the side pieces 25 are bent outwards, then downwards and then inwards to form horizontal upper parts 26, vertical intermediate parts 27 and inwardly extending lower parts 28. When the inverted U-shaped member 13 is in its operative position, as shown in Figures 1, 7 and 8, the horizontal upper parts 26 rest on the intermediate parts of the side portions of the margin of the cover 12. The vertical intermediate parts 27 lap the central parts of the outer side surface of the side portions 19 of the flange-part of the frame and the inwardly extending lower parts 28 underlie the central parts of the lower surfaces of said side portions 19 of the flange-part. The vertical intermediate parts 27 of the lower ends of the side pieces 25 of the inverted U-shaped member 13 are wedge-shaped like the intermediate parts of the side portions 19 of the flange-part 16 of the frame 11. The inwardly extending lower parts 28 are forwardly and upwardly inclined due to the wedge-shape character of the vertical intermediate parts 27. They extend at a comparatively small acute angle with respect to the horizontal upper parts 26 and define with such parts and the vertical intermediate parts 27 inwardly facing open side and open ended wedge-shaped channels 29 for slidably receiving the side portions of the margin of the cover and the wedge-shaped side portions 19 of the flange-part 16 of the frame 11. When the inverted U-shaped member 13 is in its operative position as shown in Figures 1, 7 and 8 the inwardly extending parts 28 grip the central portions of the bottom surfaces of the side portions 19 of the flange-part 16 of the frame 11 with a wedge action with the result that the horizontal upper parts 26 serve to clamp the marginal portion of the cover 12 firmly and tightly against the flat top surface 18 of the flange-part 16.

When it is desired to use the container the cover is first removed. Thereafter the bottom 10 is mounted in place on the continuous inwardly extending flange 15 at the lower end of the container body 9 and the container is filled by introducing the food product into the body interior via the open upper end of the body. After filling of the container body to the desired extent the cover 12 is preferably positioned on the flange part of the frame 11. Thereafter the inverted U-shaped member 13 is positioned in front of the frame and so that the large rear ends of the channels 29 are in alignment with the side marginal portions of the cover 12 and the side portions 19 of the flange-part 16. After so positioning the member 13 the latter is slid rearwards so as to bring it into its operative position wherein it extends across the central or intermediate parts of said side portions 19 and the horizontal upper parts 26 serve to clamp the marginal portion of the cover firmly against the flat top surface 18 of said flame-part 16 of the frame. After the food product is processed in the container body and is subsequently molded or chilled for setting purposes the inverted U-shaped member 13 is slid forwards so as to release the cover 12 for removal purposes. After removal of the cover 12 upward pressure is applied to the bottom 10 in order to extrude the food product. The extruded food product is in mold form and may be cut into slices for use in connection with sandwiches.

The herein described container effectively and efficiently fulfills its intended purpose and possesses long life due to the design, arrangement and construction of the frame 11. Such frame serves to reenforce the open upper end of the container body and coacts with the inverted U-shaped member 13 releasably to clamp the cover 12 in its closed or operative position. Due to its construction the container as a whole is capable of being produced at a comparatively low cost and may be handled or manipulated with facility.

The invention is not to be understood as restricted to the details set forth since these may be modified within the scope of the appended claim without departing from the spirit and scope of the invention.

Having thus described the invention what I claim as new and desire to secure by Letters Patent is:

As a new article of manufacture, a container designed primarily to retain and mold a food product in connection with processing thereof and comprising an elongated tubular body of rectangular cross section and uniform cross section from end to end, formed of sheet metal, adapted to extend vertically, and having the upper end thereof normally open, a separately formed continuous horizontally extending metallic frame positioned over the upper end of the body, formed of a single transversely bent length of extruded metal, shaped substantially conformably to the cross sectional shape of said body, having its ends in abutment with one another and welded together, and consisting of a rectangular outwardly extending comparatively thick solid flange-part with the bottom surfaces of two oppositely disposed side portions thereof machined in such manner that said two portions are of wedge shaped configuration, and a rectangular comparatively thin skirt-part connected to, and depending from, the inner lower corner of the flange-part, having the same shape and thickness as the upper end of the body, having its inner surfaces flush with, and forming continuations of, the inner surfaces of the flange-part and the body, and having its lower edge in registry with, and welded to, the upper edge of said body, a cover shaped substantially conformably to, and adapted to have its marginal portion rest on the top surface of, the flange-part of the frame, and an inverted U-shaped member adapted releasably to clamp the cover in place, formed of a one-piece sheet metal stamping, and embodying a pair of spaced apart depending side pieces having formed therein inwardly facing open ended wedge shaped channels for slidably receiving the wedge shaped oppositely disposed side portions of the flange-part of the frame.

References Cited in the file of this patent

UNITED STATES PATENTS

| | | |
|---|---|---|
| 163,899 | Tilton | June 1, 1875 |
| 463,253 | Moore | Nov. 17, 1891 |
| 570,096 | Hicok | Oct. 27, 1896 |
| 697,472 | Giessel | Apr. 15, 1902 |
| 1,097,448 | Lammine | May 19, 1914 |
| 1,441,304 | Slocomb | Jan. 9, 1923 |
| 1,768,188 | Champion | June 24, 1930 |
| 2,133,461 | McAbee | Oct. 18, 1938 |
| 2,381,890 | Ebbetts | Aug. 14, 1945 |
| 2,665,822 | Crawford | Jan. 12, 1954 |

FOREIGN PATENTS

| | | |
|---|---|---|
| 82,231 | Switzerland | Sept. 16, 1919 |
| 573,597 | Germany | Apr. 3, 1933 |
| 977,142 | France | Nov. 8, 1950 |